US012523966B2

(12) United States Patent
Hirano et al.

(10) Patent No.: US 12,523,966 B2
(45) Date of Patent: Jan. 13, 2026

(54) TIMEPIECE

(71) Applicant: SEIKO EPSON CORPORATION, Tokyo (JP)

(72) Inventors: Hajime Hirano, Shiojiri (JP); Kazunori Hoshino, Matsumoto (JP); Genta Kawabe, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 321 days.

(21) Appl. No.: 18/355,127

(22) Filed: Jul. 19, 2023

(65) Prior Publication Data

US 2024/0027963 A1 Jan. 25, 2024

(30) Foreign Application Priority Data

Jul. 20, 2022 (JP) ................................ 2022-115362

(51) Int. Cl.
*G04B 9/00* (2006.01)

(52) U.S. Cl.
CPC .................................. *G04B 9/005* (2013.01)

(58) Field of Classification Search
CPC ................................ G04B 9/005; G04B 9/00
USPC ........................................................ 368/66
See application file for complete search history.

(56) References Cited

U.S. PATENT DOCUMENTS 8,801,269 B2 * 8/2014 Grossenbacher .... G04B 19/225 368/208
2007/0041277 A1* 2/2007 Gerber .................. G04B 9/005 368/210
2012/0311862 A1* 12/2012 Knuchel ............. G04B 37/005 29/896.3
2021/0088975 A1* 3/2021 Tschumi ............... G04B 37/08
2021/0232099 A1* 7/2021 Hiraya .................. G04B 19/02
2021/0294271 A1* 9/2021 Kissling ................ G04F 7/0866

FOREIGN PATENT DOCUMENTS

DE 102004010125 A1 * 9/2004 ............ G04B 9/005
JP 2021-117105 A 8/2021

* cited by examiner

*Primary Examiner* — Edwin A. Leon
*Assistant Examiner* — Kevin Andrew Johnston
(74) *Attorney, Agent, or Firm* — Harness, Dickey & Pierce, P.L.C.

(57) ABSTRACT

A timepiece provides a timepiece of a type in which a crown is wound to extend a reserve period, which includes a power reserve indicator provided at a rear surface and configured to display an amount of reserve, in which the crown is provided at a right side when a dial at a front surface is viewed from a direction normal to the dial in front view such that 12 o'clock is positioned upward, and various types of display are appropriately readable when the crown is provided at the right side when the rear surface is viewed from a direction normal to the rear surface in front view.

10 Claims, 3 Drawing Sheets

TIMEPIECE

The present application is based on, and claims priority from JP Application Serial Number 2022-115362, filed on Jul. 20, 2022, the disclosure of which is hereby incorporated by reference herein in its entirety.

BACKGROUND

1. Technical Field

The present disclosure relates to a timepiece.

2. Related Art

For example, JP-A-2021-117105 discloses a mechanical timepiece in which a mainspring is wound to drive a movement. In this timepiece, a power reserve indicator configured to display the amount of reserve serving as the amount of winding of the mainspring or the remaining amount of power reserve of the mainspring is disposed at the rear surface with the aim of increasing display information at the front surface or of simplifying display at the front surface due to a design reason.

However, with the power reserve indicator in JP-A-2021-117105, no numerical value is displayed at the indicator. This results in a problem in that it is difficult to appropriately read the amount of reserve of the mainspring.

SUMMARY

A timepiece provides a timepiece of a type in which a crown is wound to extend a reserve period, which includes a power reserve indicator provided at a rear surface and configured to display an amount of reserve, in which the crown is provided at a right side when a dial at a front surface is viewed from a direction normal to the dial in front view such that 12 o'clock is positioned upward, and various types of display are appropriately readable when the crown is provided at the right side when the rear surface is viewed from a direction normal to the rear surface in front view.

A timepiece provides a timepiece of a type in which a crown is wound to extend a reserve period, which includes a power reserve indicator provided at a rear surface and configured to display an amount of reserve, in which an upward-downward direction of a character at the rear surface is inverted relative to the upward-downward direction of a character of a dial at a front surface.

DESCRIPTION OF EXEMPLARY EMBODIMENTS

1. First Embodiment

First, a timepiece 1 according to a first embodiment will be described with reference to FIGS. 1 and 2.

Note that the timepiece 1 according to the present embodiment is a mechanical timepiece of a type in which a crown 7 is wound to extend the reserve period. In addition, in following FIGS. 1, 2, and 3, the X-axis, the Y-axis, and the Z-axis are illustrated as three axes perpendicular to each other, for the purpose of convenience of explanation. Furthermore, a direction along the X-axis is referred to as an "X direction". A direction along the Y-axis is referred to as a "Y direction". A direction along the Z-axis is referred to as a "Z direction". In addition, the arrowed side of each of the axes is also referred to as a "plus side". The side opposite from the arrow is also referred to as a "minus side". Furthermore, the plus side in the X direction is also referred to as "right". The minus side in the X direction is also referred to as "left". The plus side in the Y direction is also referred to as "upward". The minus side in the Y direction is also referred to as "downward". The plus side in the Z direction is also referred to as "front". The minus side in the Z direction is also referred to as "rear". In addition, explanation will be made such that a diagram as viewed from the plus Z direction is referred to as a "front diagram", and a diagram as viewed from the minus Z direction is referred to as a "rear view".

Figure 1:
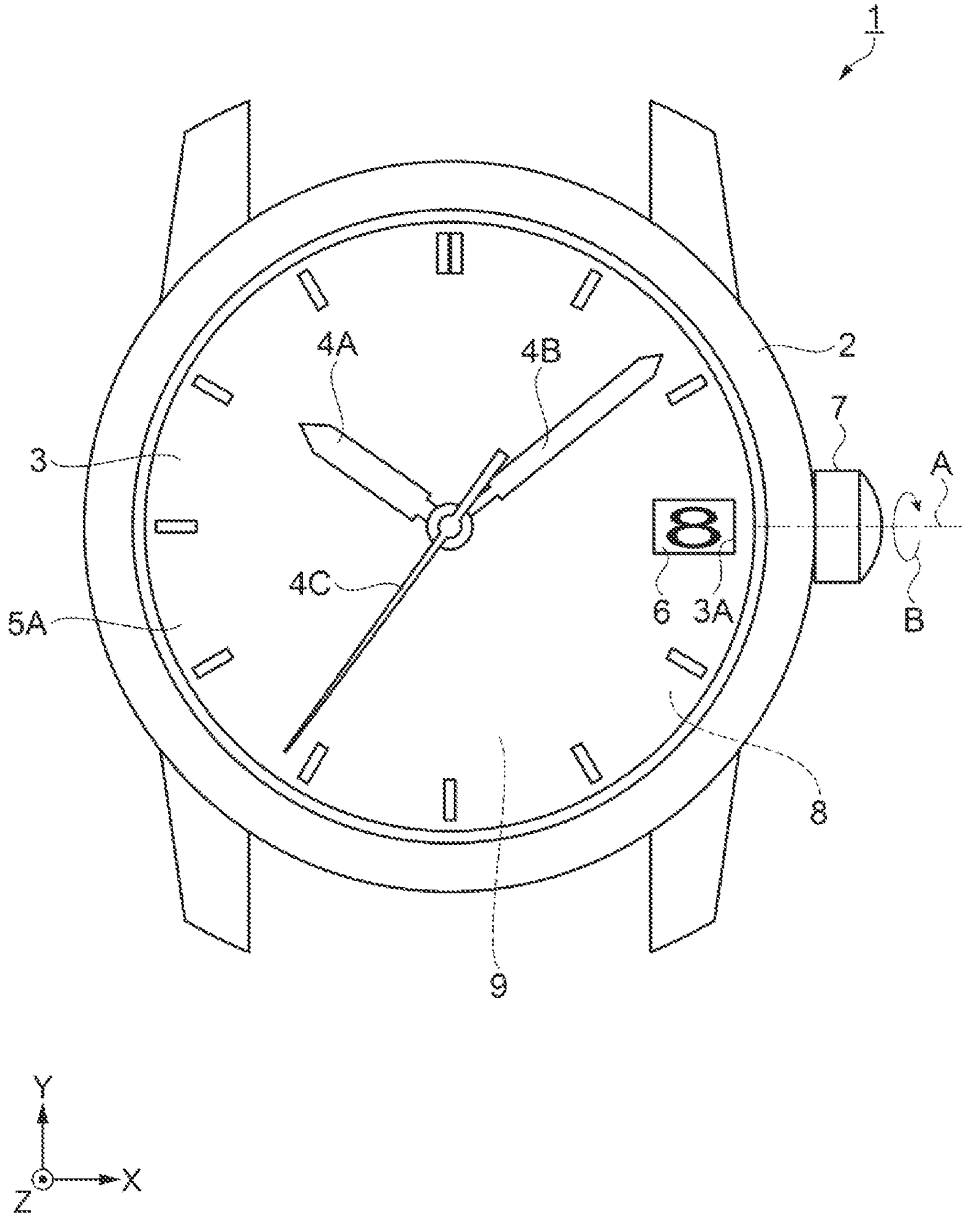
FIG. 1 is a front diagram illustrating a timepiece according to a first embodiment.
Figure 2:
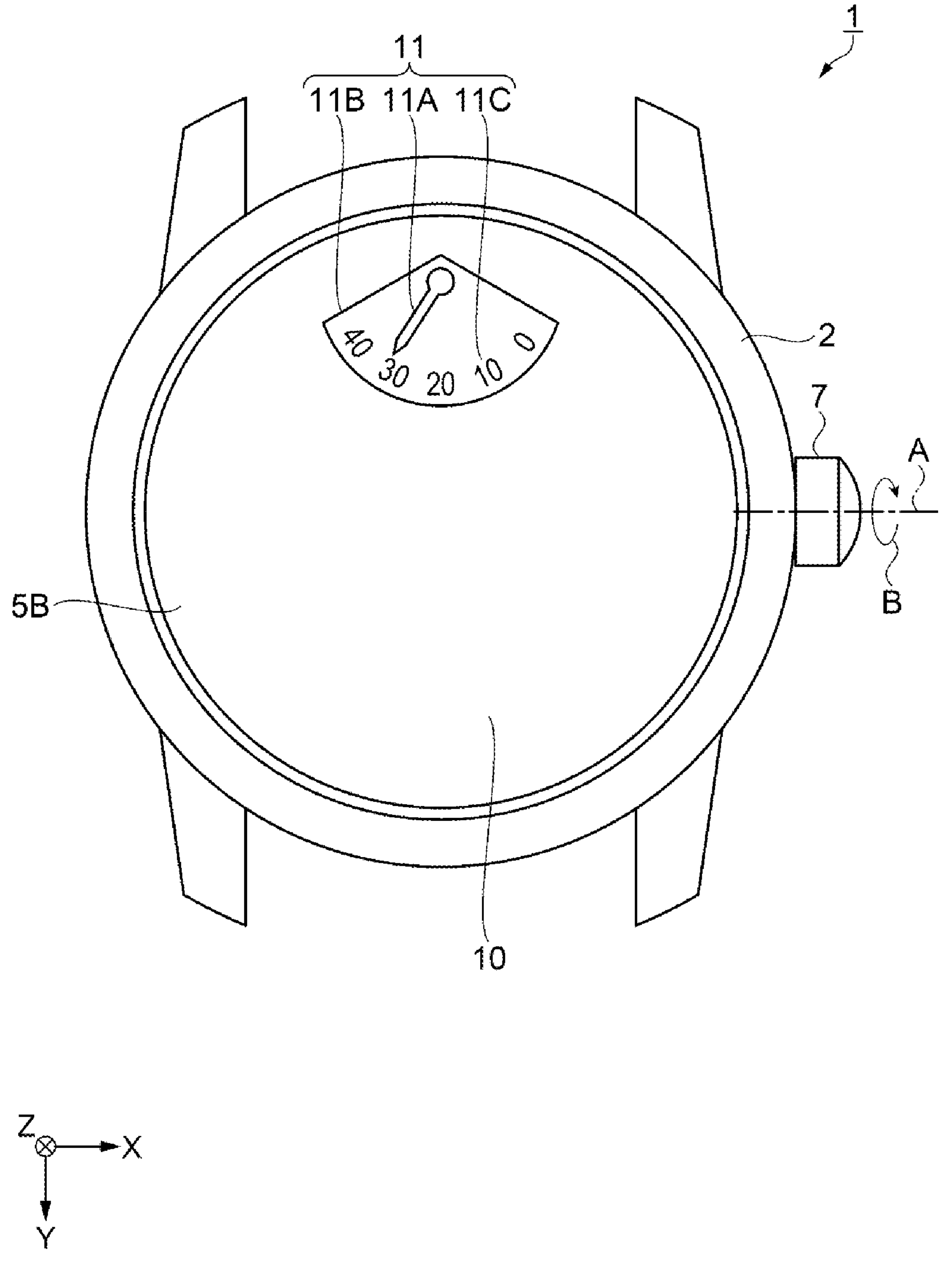
FIG. 2 is a diagram illustrating a rear surface of the timepiece according to the first embodiment.

As illustrated in FIGS. 1 and 2, the timepiece 1 includes an outer case 2 having a tubular shape. A dial 3 having a disk shape is disposed at a front surface 5A of the timepiece 1 and at an inner peripheral side of the outer case 2. The outer case 2 is provided at a rear surface 5B of the timepiece 1. A case back 10 having a disk shape is disposed at the inner peripheral side of the outer case 2. There is provided a power reserve indicator 11 configured to display the amount of reserve serving as the amount of winding of the mainspring 9 or the remaining amount of power reserve of the mainspring. Note that, of two openings of the outer case 2, the opening at the front surface 5A side and the opening at the rear surface 5B side are each covered with a cover glass.

In addition, the timepiece 1 includes a movement 8 accommodated within the outer case 2, and the mainspring 9 configured to drive the movement 8.

An hour hand 4A, a minute hand 4B, and a seconds hand 4C configured to display time information is provided at the front surface 5A of the timepiece 1. The hands such as the hour hand 4A, the minute hand 4B, and the seconds hand 4C are attached at the hand shaft of the movement 8, and are driven by the movement 8.

A calendar small window 3A is provided at the dial 3, which allows a date indicator 6 to be visually recognized from the calendar small window 3A.

A power reserve hand 11A configured to indicate the amount of reserve of the mainspring 9 is provided at the rear surface 5B of the timepiece 1. The power reserve hand 11A moves in association with winding of the mainspring 9.

An indicator 11B on which characters 11C from 0 to 40 associated with the power reserve indicator 11 are marked is disposed at the case back 10. The characters 11C are numbers each indicating the amount of reserve. Thus, the power reserve indicator 11 serving as one of various types of display is comprised of the power reserve hand 11A, the indicator 11B, and the characters 11C. Note that, when the mainspring 9 is fully wound, the timepiece 1 according to the present embodiment is able to secure the amount of reserve of approximately 40 hours.

In addition, when the rear surface 5B of the timepiece 1 is viewed from a direction normal to the dial 3 as the front view such that the crown 7 is disposed at the right side, the upward-downward direction of the characters 11C of the power reserve indicator 11 disposed at the rear surface 5B is inverted relative to the upward-downward direction of the characters at the dial 3 of the front surface 5A. Thus, it is possible to appropriately read the amount of reserve.

The crown 7 is provided at a side surface of the outer case 2. The crown 7 is provided at a right side of the outer case 2 when the dial 3 at the front surface 5A is viewed from a direction normal to the dial 3 in front view such that 12 o'clock is positioned upward.

The crown 7 can be pulled in two steps from the zero-step position that is a normal position where the crown is pushed in toward the center of the timepiece 1.

By rotating the crown 7 at the zero-step position, it is possible to wind the mainspring 9.

By pulling the crown 7 to the one-step position to rotate it, it is possible to move the date indicator 6 to adjust the date. By pulling the crown 7 to the two-step position, the seconds hand 4C stops, and by rotating the crown 7 at this two-step position, it is possible to move the hour hand 4A and the minute hand 4B to adjust the time.

Note that, when the crown 7 is viewed in side view, a direction in which the crown 7 is wound manually is a first direction that is a clockwise direction indicated by the arrow B relative to a rotary axis A of the crown 7. In addition, when the rear surface 5B of the timepiece 1 is viewed from a direction normal to the rear surface 5B as the front view such that the crown 7 is disposed at the right side, the direction in which the crown 7 is wound is the first direction. Thus, it is possible to view the power reserve indicator 11 while the mainspring 9 is being wound, which makes it possible to easily check the amount of reserve.

The upward-downward direction of the characters 11C of the power reserve indicator 11 disposed at the rear surface 5B of the timepiece 1 is inverted relative to the upward-downward direction of the characters of the dial 3 at the front surface 5A.

As described above, in the timepiece 1 according to the present embodiment, the power reserve indicator 11 configured to indicate the amount of reserve is disposed at the rear surface 5B. In addition, when the rear surface 5B is viewed from the direction normal to the rear surface 5B as the front view such that the crown 7 is disposed at the right side, the upward-downward direction of the characters 11C of the power reserve indicator 11 is inverted relative to the upward-downward direction of the characters of the dial 3 at the front surface 5A. This makes it possible to appropriately read the display as to the amount of reserve.

In addition, when the rear surface 5B of the timepiece 1 is viewed from the direction normal to the rear surface 5B as the front view such that the crown 7 is disposed at the right side, the direction in which the crown 7 is wound is the first direction that is a clockwise direction relative to the rotary axis A of the crown 7. This makes it possible to view the power reserve indicator 11 while the mainspring 9 is being wound, which makes it possible to easily check display as to the amount of reserve.

2. Second Embodiment

Figure 3:
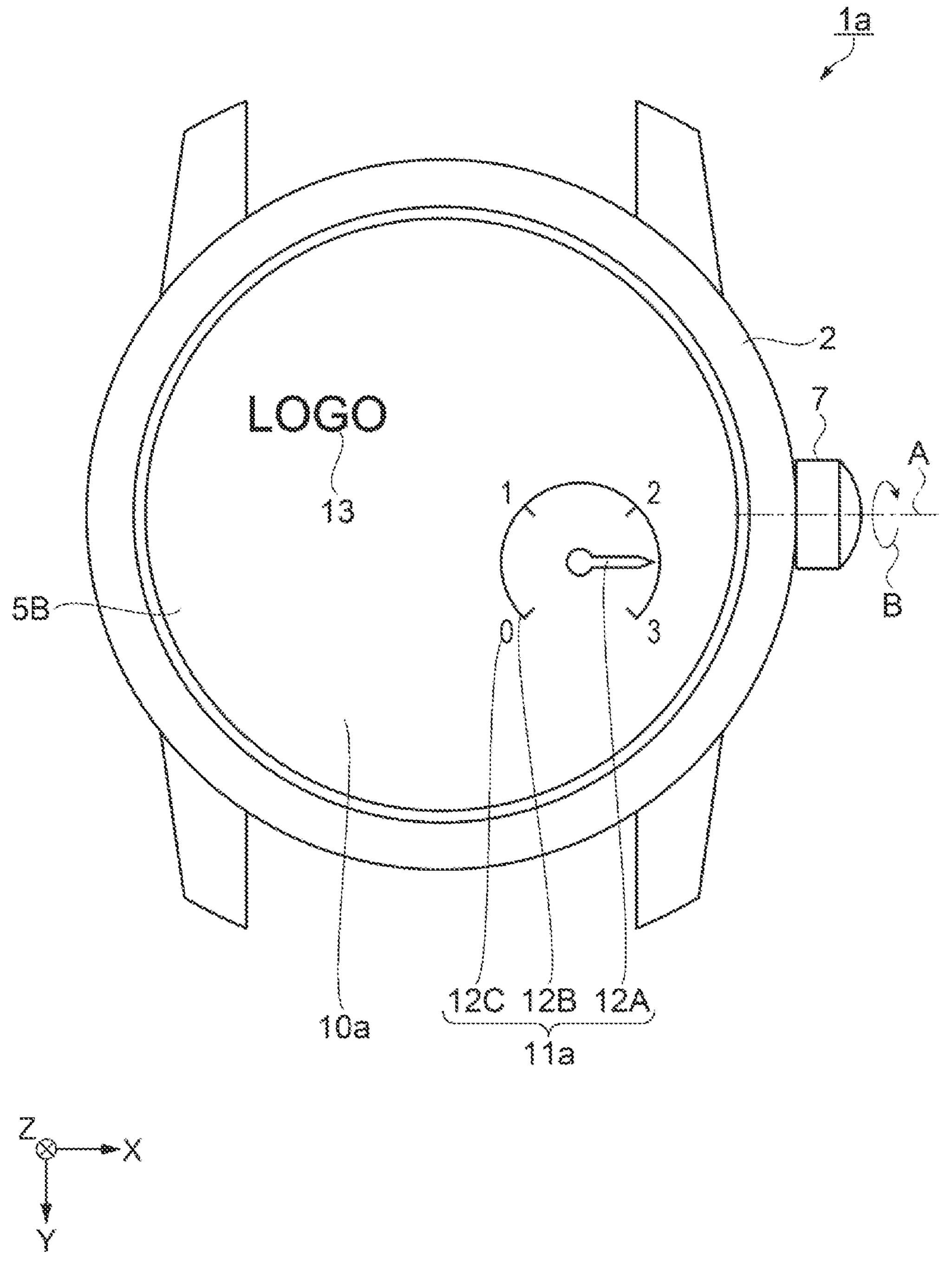
FIG. 3 is a diagram illustrating a rear surface of a timepiece according to a second embodiment.

Next, a timepiece 1*a* according to a second embodiment will be described with reference to FIG. 3.

The timepiece 1*a* according to the present embodiment is similar to the timepiece 1 according to the first embodiment except that various types of display including the power reserve indicator 11*a* disposed at the rear surface 5B differ. Note that the same reference characters are attached to configurations similar to those in the first embodiment described above. Description will be made with focus being placed on portions differing from the first embodiment described above, and explanation of similar matters will not be repeated.

A logo 13 and a power reserve indicator 11*a* including a power reserve hand 12A, an indicator 12B, and characters 12C are disposed at the rear surface 5B of the timepiece 1*a*. Specifically, the characters 12C, the indicator 12B, and the logo 13 are marked at the case back 10*a*. The characters 12C ranges from 0 to 3 indicating the number of days associated with the power reserve indicator 11*a*. The logo 13 indicates a company name or a product name of the timepiece 1*a*. Note that, when the mainspring 9 is fully wound, the timepiece 1*a* according to the present embodiment is able to secure the amount of reserve of approximately 3 days.

In addition, when the rear surface 5B of the timepiece 1*a* is viewed from the direction normal to the rear surface 5B as the front view such that the crown 7 is disposed at the right side, the upward-downward direction of the characters 12C of the power reserve indicator 11*a* and the logo 13 disposed at the rear surface 5B is inverted relative to the upward-downward direction of the characters of the dial 3 at the front surface 5A. This makes it possible to appropriately read the amount of reserve and the logo 13.

With such a configuration, it is possible to obtain effects similar to those obtained in the first embodiment. That is, by disposing the crown 7 at the right side when the rear surface 5B is viewed from the direction normal to the rear surface 5B as the front view, it is possible to appropriately read various types of display including the power reserve indicator 11*a*.

What is claimed is:

1. A timepiece of a type in which a crown is wound to extend a reserve period, comprising:

a power reserve indicator provided at a rear surface of the timepiece and configured to display an amount of the reserve period, the power reserve indicator including a plurality of numbers indicating the amount of the reserve period, wherein the crown is provided at a right side when a dial at a front surface of the timepiece is viewed from a direction normal to the dial in a front view such that 12 o'clock is positioned upward, and at least one of the plurality of numbers is in an upright orientation and is oriented toward 6 o'clock when the crown is provided at the right side when the rear surface is viewed from a direction normal to the rear surface in a front view.

2. The timepiece according to claim 1, wherein the power reserve indicator is provided with a character associated with the power reserve indicator.

3. The timepiece according to claim 1, wherein the power reserve indicator includes 0 as one of the plurality of numbers.

4. The timepiece according to claim 1, wherein the rear surface includes a character indicating a logo.

5. The timepiece according to claim 1, wherein a direction in which the crown is wound manually is a first direction when the crown is viewed in a side view, and when the rear surface of the timepiece is viewed from the direction normal to the rear surface in the front view such that the crown is positioned at the right side, a direction in which the crown is wound is the first direction.

6. A timepiece of a type in which a crown is wound to extend a reserve period, comprising:

a power reserve indicator provided at a rear surface of the timepiece and configured to display an amount of the reserve period, the power reserve indicator including a plurality of numbers indicating the amount of the reserve period, wherein an upward-downward direction of the plurality of numbers at the rear surface is inverted relative to the upward-downward direction of a character of a dial at a front surface of the timepiece, and at least one of the plurality of numbers is in an upright orientation and is oriented toward 6 o'clock when a crown is provided at a right side when the rear surface is viewed from a direction normal to the rear surface in a front view.

7. The timepiece according to claim 6, wherein the power reserve indicator is provided with a character associated with the power reserve indicator.

8. The timepiece according to claim 6, wherein the power reserve indicator includes 0 as one of the plurality of numbers.

9. The timepiece according to claim 6, wherein the rear surface includes a character indicating a logo.

10. The timepiece according to claim 6, wherein a direction in which the crown is wound manually is a first direction when the crown is viewed in a side view, and when the rear surface of the timepiece is viewed from the direction normal to the rear surface in the front view such that the crown is positioned at the right side, a direction in which the crown is wound is the first direction.

* * * * *